Jan. 5, 1932.   A. W. PRIEBE   1,839,437
MOVABLE GROUND FOR ARC WELDING
Filed Aug. 5, 1929
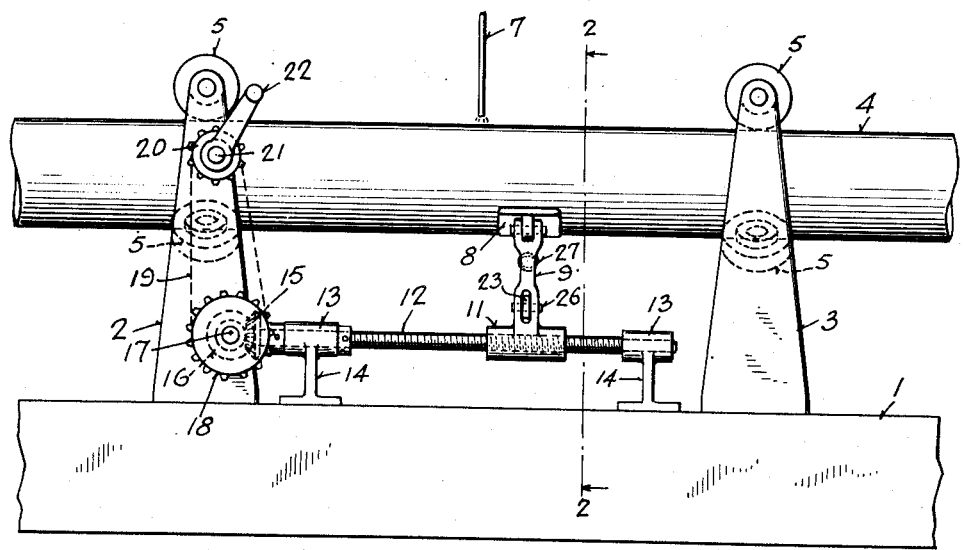
INVENTOR.
Arthur W. Priebe
BY
ATTORNEY.

Patented Jan. 5, 1932

1,839,437

UNITED STATES PATENT OFFICE

ARTHUR W. PRIEBE, OF MILWAUKEE, WISCONSIN, ASSIGNOR TO A. O. SMITH CORPORATION, OF MILWAUKEE, WISCONSIN, A CORPORATION OF NEW YORK

MOVABLE GROUND FOR ARC WELDING

Application filed August 5, 1929. Serial No. 383,561.

This invention relates to electric arc welding wherein one terminal of a source of welding current is connected to a fusible weldrod and the other terminal of the source is connected to the work piece. An electric arc is maintained between the fusible weldrod and the work piece, resulting in a deposition of the metal from the weldrod onto the work.

It has been found that the position of the ground terminal which connects the welding circuit with the work piece has a definite bearing on the stability and desired control of the arc and that for any given set of conditions a more rapid penetration of the arc, a conservation of heat therefrom, and a better fusion of the metal may be effected if the ground terminal is properly positioned with respect to the arc during the welding operation.

The position of the ground terminal with respect to the arc determines to some extent the direction of the welding current flowing through the work piece and the magnetic flux resulting from this current may have an adverse effect upon the desired stability and control of the arc.

One of the objects of the invention is to maintain proper magnetic flux conditions surrounding the arc to stabilize and control the same.

Another object of the invention is to provide an improved apparatus for maintaining a desired control and stabilization of the arc during the welding operation.

Another object is to provide a novel apparatus for connecting the ground terminal of a welding circuit to the article to be welded whereby the same may be readily adjusted and manipulated during the welding operation.

Other objects of the invention will appear in the following detailed description having particular reference to the accompanying drawings in which:

Figure 1 is a side elevation of the machine.

Fig. 2 is a transverse section of the machine on line 2—2 of Figure 1.

The machine shown is adapted to weld the longitudinal seams of tubular articles and comprises in general the supporting frame 1 having a plurality of upright standards 2 and 3 for supporting the tubular blanks 4. The standards have rollers 5 arranged thereon to support the pipe 4 in longitudinally movable relation. The pipe 4 has a longitudinal seam 6 to be welded, which seam is arranged at the top of the pipe, and, as the pipe is traveled longitudinally through the machine, the seam passes under a weldrod 7, and an electric arc is established between the weldrod and the pipe to fuse the metal of the seam and weld the pipe into an integral structure.

The pipe is grounded by means of ground terminals 8 arranged at the bottom thereof for conducting the welding current into or away from the pipe, depending upon the direction of the current at the arc.

The ground terminals are pivotally supported by upright arms 9 and 10 which are mounted for movement longitudinally of the pipe by means of a screw threaded sleeve 11 at the base thereof which sleeve is adapted to receive shafts or threaded spindles 12 which are suitably journaled at 13 to the cross members 14 which form the base of the frame 1.

One end of each threaded spindle 12 is provided with a bevel gear 15 adapted to be rotated by bevel gears 16 mounted on a transverse shaft 17. The shaft 17 is provided with a sprocket wheel 18 for receiving an endless chain 19 which is connected to a sprocket wheel 20 on the shaft 21 journaled on the welding frame 1. The shaft 21 is provided with a handle 22 which may be operated to cause a rotary movement of the threaded spindles 12 and thereby adjust the longitudinal position of the ground terminals. Various other mechanisms may be employed for providing such adjustment.

The arms 9 and 10 are connected by means of a link 23 near the lower ends thereof, the link being provided at its ends with slots 24 and 25 for receiving pivot pins 26 on the respective arms for permitting independent pivotal movement of the arms 9 and 10. A spring 27 is arranged between the upper ends of the arms 9 and 10 and tends to pull the same toward each other and thereby press the ground terminals against the pipe.

In welding pipe of substantial length, it has been found advisable to move the ground terminals farther ahead of the arc when starting the latter at the end of the pipe than during the welding at the center of the pipe, and to move the terminals to a position behind the arc as the latter approaches the other end of the pipe. In this manner the magnetic flux may be so controlled that the welding will be uniform throughout the length of the pipe.

Furthermore, it has been found advisable to position the terminals differently when starting the arc than after the same is struck. When welding with several layers, as by several passes along the seam, it has been found preferable to set the terminals at different positions for the different passes of the arc.

Other features, such as changing contact pressure of the terminals, may also affect the desired position of the terminals with respect to the arc.

This desired longitudinal movement of the ground terminals during the welding operation is provided for by the present machine in that the arms 9 and 10 are movable longitudinally along the threaded spindles 12, permitting the ground terminals to be positioned either ahead or behind the welding arc.

Various modifications of the embodiment may be employed within the scope of the accompanying claims.

I claim:

1. In an apparatus for progressive arc welding tubular members, a weldrod in arcing relationship to the edges to be welded and connected to one terminal of a source of welding current, a ground terminal connecting said member to the other terminal of a source of welding current, and means for adjusting the position of said ground terminal with respect to said weldrod to control and stabilize the welding arc.

2. In an apparatus for electric arc welding, a weldrod in arcing relation to the parts to be welded, a pair of spaced ground terminals arranged to connect the parts to be welded to the source of welding current, and means for adjusting the position of said terminals with respect to said weldrod to effect a control of the arc.

3. In an apparatus for progressive arc welding tubular articles, an electrode in arcing relation to the longitudinal edges to be welded and connected to one terminal of a source of welding current, and an adjustably movable ground terminal connecting the tubular article to the other terminal of the source of welding current.

4. In a method of progressive arc welding, the step of adjusting the position of the ground terminal relative to the weldrod during the welding operation.

5. In the method of electric arc welding wherein one terminal of a source of welding energy is connected to a fusible metallic weldrod and the other terminal of said source is connected to the parts to be welded by a ground terminal, the step of adjusting the position of the ground terminal relative to the position of the weldrod to control and stabilize the arc.

6. In the method of progressive welding the longitudinal seams of tubular articles, wherein one terminal of a source of welding energy is connected to a fusible weldrod and the other terminal of said source of welding energy is connected to the tubular article, the steps of moving said tubular article relative to the weldrod to cause the arc to traverse the seam, and adjusting the position of the ground terminal relative to the weldrod to effect a desired control of the arc.

7. The method of electric welding longitudinal seams of pipe which comprises establishing an electric arc between a fusible metallic electrode and the edges to be welded, providing a ground terminal on each side of the seam, and adjusting the position of said terminal with respect to the electrode during the relative travel of the arc along the seam.

8. The method of electric arc welding longitudinal seams of pipe which comprises establishing an electric arc between a fusible metallic electrode and the edges to be welded, moving said electrode relatively along the pipe to cause the arc to traverse the seam a plurality of times, providing a ground terminal to connect the pipe to the source of welding energy, and adjusting the position of the ground terminal with respect to the arc for the different passes of the arc along the seam.

9. A method of electric arc welding longitudinal seams of tubular articles which comprises establishing an electric arc between a fusible metallic electrode and the edges to be welded, moving said electrode relatively along the pipe to cause the arc to traverse the seam to be welded, and adjusting the position of the ground terminal with respect to the arc differently when the arc is near the respective ends of the tubular article in accordance with the direction of travel of the arc to obtain uniform welding conditions at the ends of the tubular articles as well as in the central portion thereof.

10. In an apparatus for progressive arc welding longitudinal seams of tubular articles, an electrode in arcing relation to the longitudinal edges to be welded, a pair of ground terminals spaced from said electrode and connecting the tubular article with the source of welding energy, and means supporting said ground terminals comprising longitudinally extending shafts, upright arms mounted on said shafts and movable longitudinally therealong, and pivotal connections between the upper ends of said arms and said ground terminals.

In testimony whereof I have hereunto signed my name, at Milwaukee, Wisconsin, this 31st day of July, 1929.

ARTHUR W. PRIEBE.